United States Patent [19]

Puskorius et al.

[11] Patent Number: 5,732,382
[45] Date of Patent: Mar. 24, 1998

[54] METHOD FOR IDENTIFYING MISFIRE EVENTS OF AN INTERNAL COMBUSTION ENGINE

[75] Inventors: Gintaras Vincent Puskorius, Novi;
Lee Albert Feldkamp, Plymouth;
Kenneth Andrew Marko, Ann Arbor;
John Victor James, Walled Lake;
Timothy Mark Feldkamp, Ann Arbor,
all of Mich.

[73] Assignee: Ford Global Technologies, Inc., Dearborn, Mich.

[21] Appl. No.: 744,258

[22] Filed: Nov. 6, 1996

[51] Int. Cl.$^6$ .................... F02D 15/00; G01M 15/00
[52] U.S. Cl. .................... 701/110; 73/116; 73/117.3; 123/419; 123/436
[58] Field of Search .................... 73/116, 117.2, 73/117.3; 123/419, 436; 364/431.03, 431.07, 431.08; 701/101, 110, 111

[56] References Cited

U.S. PATENT DOCUMENTS

| | | | |
|---|---|---|---|
| 4,494,509 | 1/1985 | Long | 123/416 |
| 5,044,194 | 9/1991 | James et al. | 73/112 |
| 5,044,195 | 9/1991 | James et al. | 73/117.3 |
| 5,056,360 | 10/1991 | Dosdall et al. | 73/116 |
| 5,105,372 | 4/1992 | Provost et al. | 73/116 |
| 5,109,695 | 5/1992 | James et al. | 73/117.3 |
| 5,117,681 | 6/1992 | Dosdall et al. | 73/116 |
| 5,269,178 | 12/1993 | Vigmostad et al. | 73/116 |
| 5,313,826 | 5/1994 | Klauber et al. | 73/118.1 |
| 5,359,518 | 10/1994 | Wimmer | 364/431.03 |
| 5,361,213 | 11/1994 | Fujieda et al. | 364/431.08 |
| 5,377,537 | 1/1995 | James | 73/117.3 |
| 5,379,634 | 1/1995 | Kuroda et al. | 73/116 |
| 5,426,587 | 6/1995 | Imai et al. | 73/117.3 |
| 5,452,604 | 9/1995 | Namiki et al. | 73/116 |
| 5,495,415 | 2/1996 | Ribbens et al. | 364/431.08 |
| 5,497,328 | 3/1996 | Sugai et al. | 364/431.03 |
| 5,531,108 | 7/1996 | Feldkamp et al. | 73/117.3 |

OTHER PUBLICATIONS

*Neurocontrol of Nonlinar Dynamical Systems with Kalman Filter Trained Recurrent Networks*, Gintaras V. Puskorius and Lee A, Feldkamp, vol. 5, No. 2 (Mar. 1994) pp. 279–297.

*Training of Robust Neural Controllers*, L. A. Feldkamp and G. V. Puskorius, Proceedings of the 33rd IEEE Conference on Decision and Control, Orlando, Florida (1994) pp. 2756–2759.

*Primary Examiner*—George M. Dombroske
*Attorney, Agent, or Firm*—Mark L. Mollon, Esq.; Roger L. May, Esq.

[57] ABSTRACT

A method for identifying engine combustion failure of an internal combustion engine having a plurality of cylinders, a crankshaft and a crankshaft position sensor includes the steps of operating the internal combustion engine to rotate the crankshaft, measuring rotational quantities of the crankshaft corresponding to events created by each of the plurality of cylinders during operation of the internal combustion engine, correcting the rotational quantities measured to remove periodic position irregularities to generate a corrected temporal signal, generating an acceleration signal of the crankshaft using the corrected temporal signals, and identifying combustion failures as a function of the acceleration signal. A time-lagged recurrent neural network utilizes the acceleration signal, along with other engine parameters to identify the cylinder-specific misfire events.

13 Claims, 7 Drawing Sheets

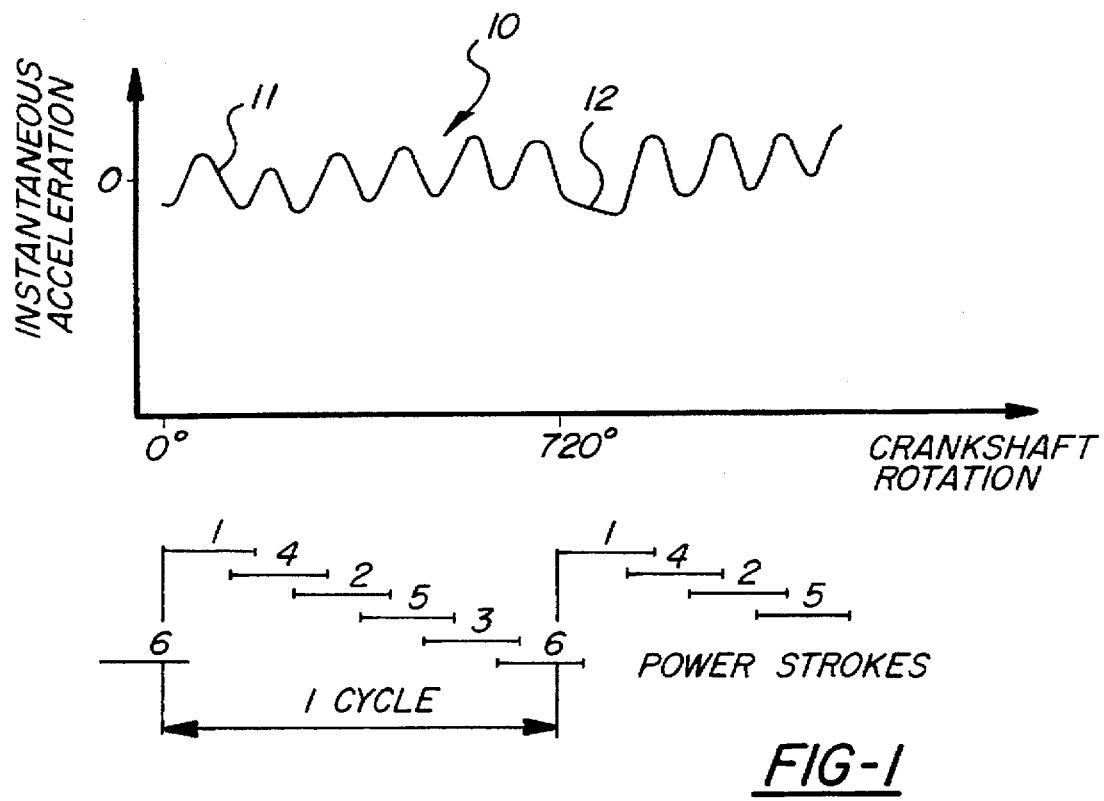
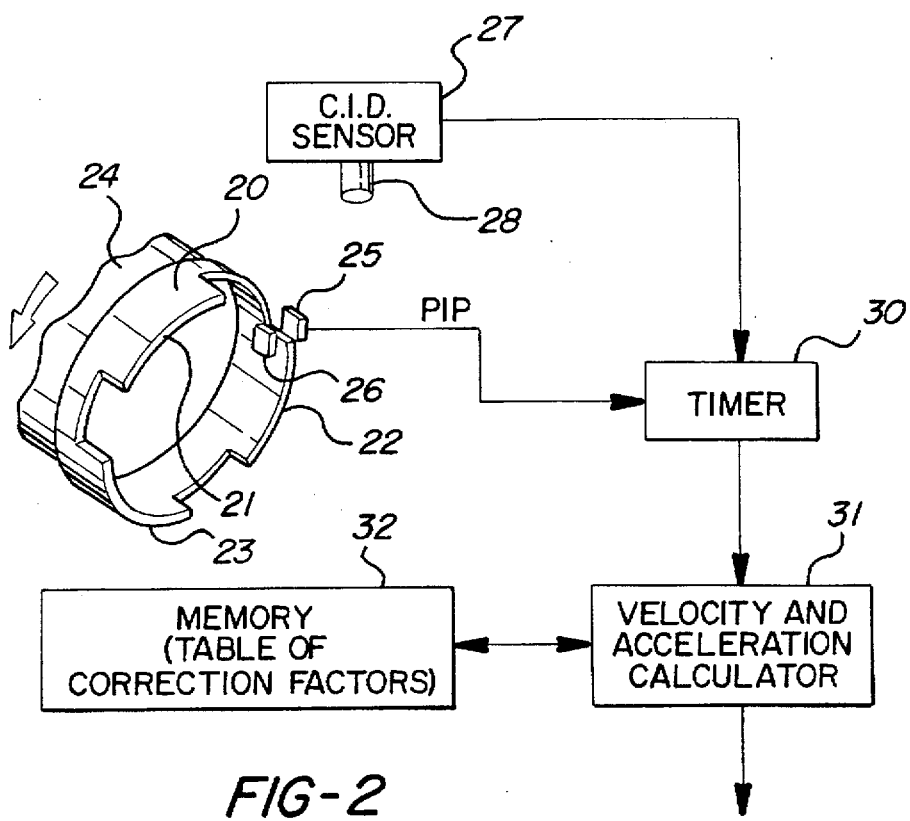

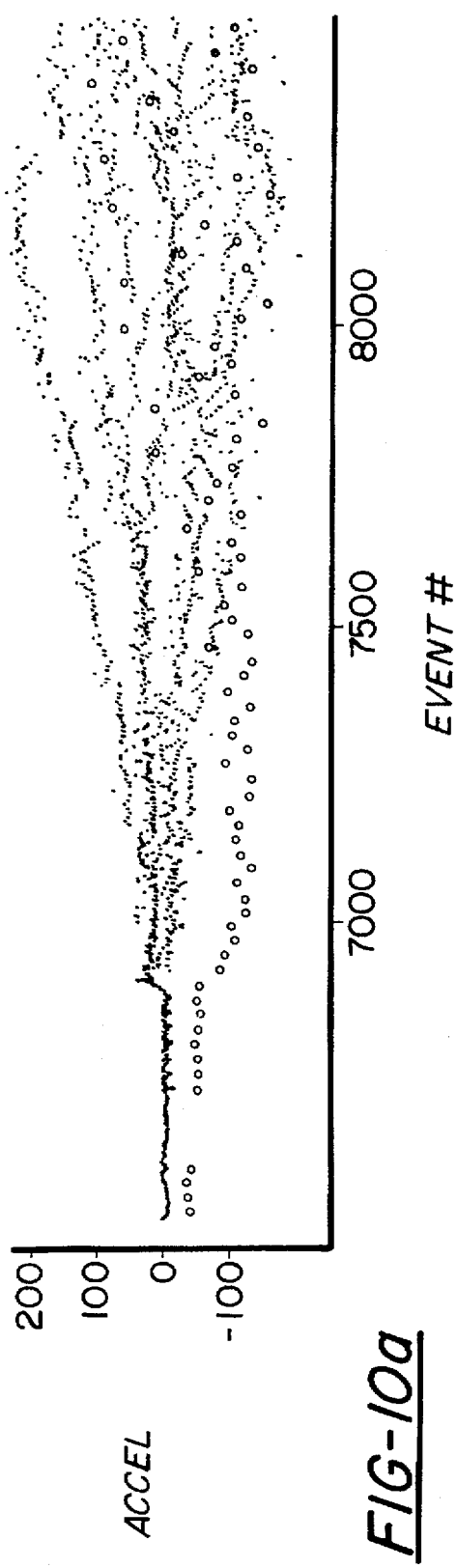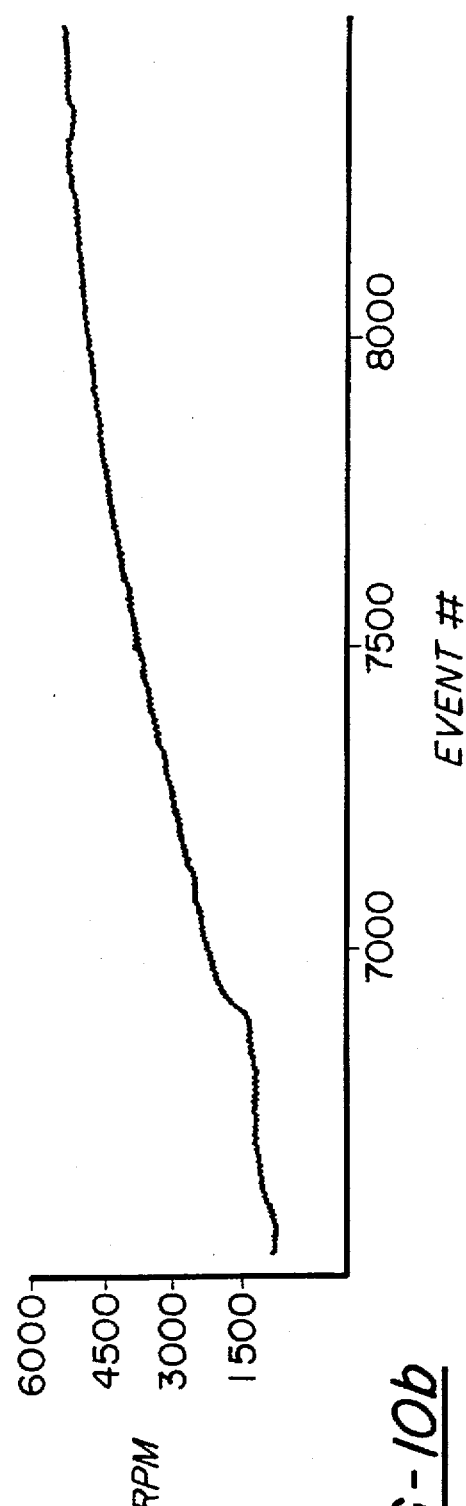
FIG-10a
FIG-10b

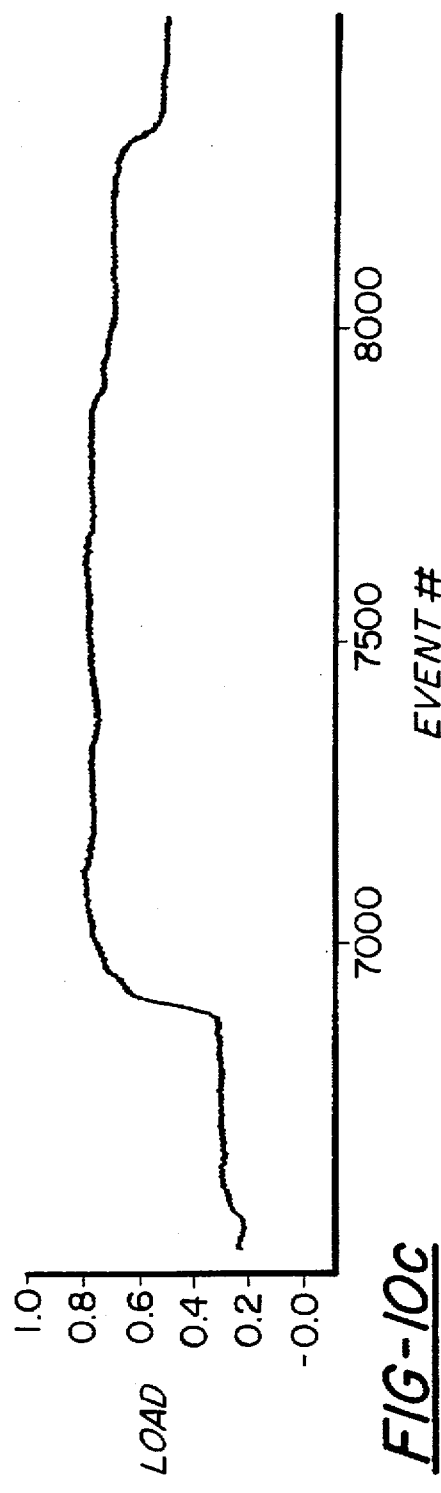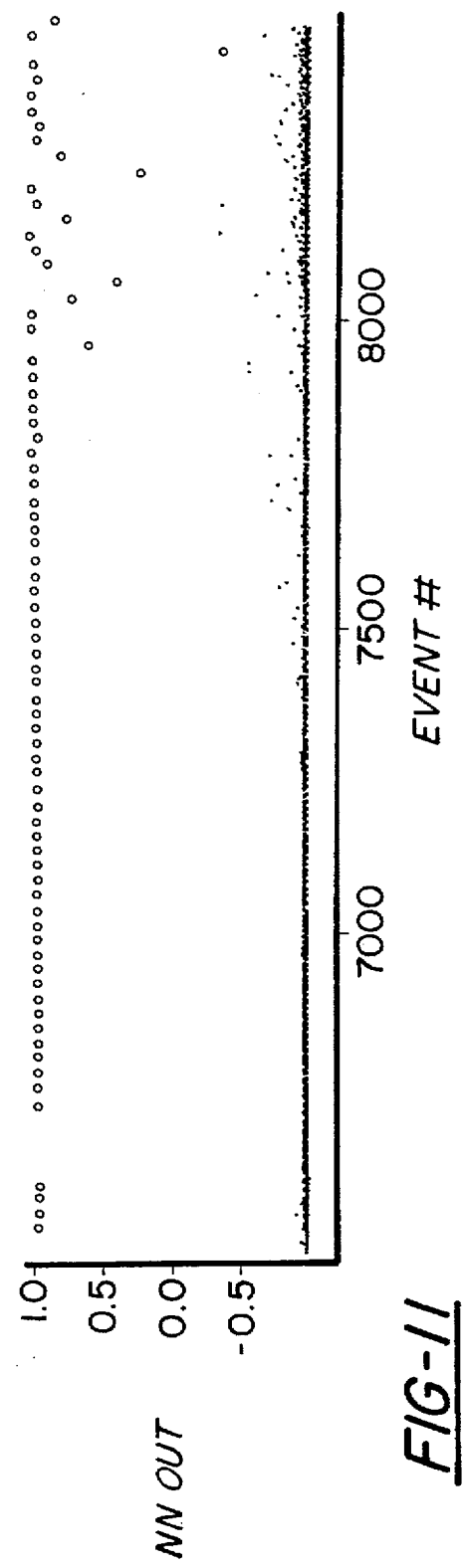

1

METHOD FOR IDENTIFYING MISFIRE EVENTS OF AN INTERNAL COMBUSTION ENGINE

BACKGROUND OF THE INVENTION

The present invention relates in general to misfire detection in internal combustion engines, and more specifically, to a method that correctly identifies misfire events of an internal combustion engine over a broad range of operating conditions in which the internal combustion engine may be found.

In the motor vehicle industry, a large effort is being devoted to the development of continuous, on-board monitoring of systems and components affecting vehicle tailpipe emissions. This diagnostic monitoring requirement is stipulated in various state and federal mandates and must be accomplished despite the current lack of practical sensors for the regulated constituents of the exhaust gases (hydrocarbons, oxides of nitrogen, and carbon monoxide). This implies that On-Board Diagnostics (OBD) must rely on limited observations of system behavior and inferences drawn from those observations to deduce whether or not the vehicle emissions are in compliance with the law. A particularly vexing situation is the diagnosis of engine combustion failures, known as misfire detection. This task must be performed under virtually all operating conditions. The misfire identification rates must be as low as one percent and identify the event in as little as ten seconds, so as to prevent any significant deterioration of the emissions control system. Such a diagnostic method must operate continuously, in real time, on all vehicles, monitoring every engine cylinder combustion event. False alarm immunity is an important concern, since the consequence of exceeding the misfire limit is illumination of the malfunction light and a trip made by the operator to a repair facility. On the other hand, high misfire detection efficiency and identification accuracy is necessary for compliance with the law.

In principle, various types of measurements could be used to detect misfire. For example, in-cylinder pressure transducers would provide a rather clear picture of the combustion process, but the cost of the sensors and the computation required for analysis would be substantial. In practice, therefore, the signals available to analyze combustion behavior are primarily based on crankshaft position measurements, from which one can calculate dynamic accelerations of the rotating shaft. Since each proper engine combustion produces a slight acceleration of the rotating shaft, misfires are discerned by detecting the "acceleration deficit" that follows a power stroke that produces little or no useful work. The degree of such a deficit depends greatly on engine loading and must be distinguished from normal acceleration and deceleration in response to inputs by the driver and from changing road conditions. Even so, if one could observe the rotational dynamics of an ideal (very stiff crankshaft and remove the background engine dynamics (the inputs made by the operator of the vehicle), the diagnostic task could be performed fairly easily. In practice, the detection of misfire is complicated by additional factors. Since the shaft is not infinitely stiff, it exhibits torsional oscillations. Furthermore, the crankshaft is driven at multiple positions along its length, causing the pattern of oscillation to be quite intricate. In addition, the placement of the sensor, generally determined by other considerations, such as cost, plays a significant role in the observed severity of torsional oscillations. Finally, irregularities in the spacing of marks used for timing lead to spurious apparent acceleration variations, which vary with engine speed. The acceleration variations may be considered noisy acceleration measurements. Correction for the latter, though straightforward, must be performed individually for each vehicle. A further source of noise in acceleration values is the finite precision of the clock used to time-stamp the measurements.

Misfire detection based on measurement of crankshaft acceleration is plagued by torsional oscillation for any timing wheel sensor mounted on the crankshaft. Currently, there is a need for a misfire detection system which will detect the occurrence of a positive misfire, i.e., an actual misfire, in all of the conditions in which the internal combustion engine will have to perform.

SUMMARY OF THE INVENTION

The present invention has the advantage that misfire identification capability is obtained over the full spectrum of operating conditions for an internal combustion engine using only crankshaft rotation measurements taken anywhere along the crankshaft.

The inventive method identifies misfire of an internal combustion engine having a plurality of cylinders, a crankshaft and a crankshaft position sensor. The method includes the steps of operating the internal combustion engine to rotate the crankshaft. Rotational quantities of the crankshaft corresponding to events created by each of the plurality of cylinders during operation of the internal combustion engine are measured. The rotational quantities are corrected to remove periodic position irregularities to generate a corrected temporal signal. An acceleration signal for the crankshaft is generated using the corrected temporal signal. Misfire is identified as a function of the acceleration signal.

BRIEF DESCRIPTION OF THE DRAWINGS

FIG. 1 is a plot showing instantaneous acceleration versus crankshaft rotation for both normal and misfiring cylinder events.

FIG. 2 is a schematic and block diagram showing a measuring and calculating apparatus used by the present inventive method.

FIGS. 10a–10c are plots of acceleration, velocity, and load as a function of event, respectively.

FIG. 11 is the output of the neural network as a function of event number.

DETAILED DESCRIPTION OF PREFERRED EMBODIMENTS

Figure 3:
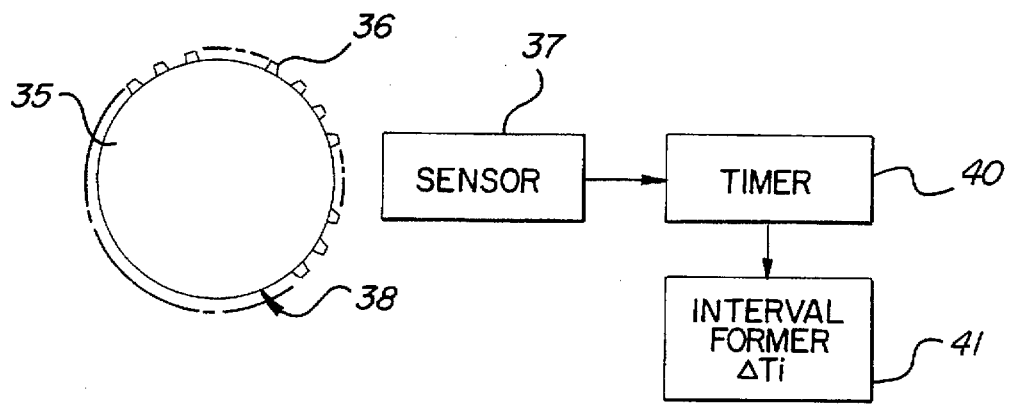
FIG. 3 shows an alternative embodiment for the measuring apparatus.

In the typical four-stroke combustion engine, the four strokes include the intake stroke, the compression stroke, the power stroke, and the exhaust stroke. As shown in FIG. 1, the power strokes of the respective cylinders are arranged in a particular order according to crankshaft position. Furthermore, in any engine having more than four cylinders, the power strokes of different cylinders will overlap. One engine cycle includes 720° of crankshaft rotation during which each cylinder passes through each of its four strokes.

Curve 10 in FIG. 1 shows approximate acceleration fluctuation during engine operation. An acceleration peak 11, denoting a maximum acceleration value, occurs during the firing interval of cylinder No. 1. Other maxima in the acceleration curve occur approximately corresponding to other properly firing cylinders. When a misfire occurs such that no significant power is created by a cylinder during its firing interval, the crankshaft decelerates as indicated at 12.

Crankshaft-based misfire detectors have advantageously employed measured rotation intervals occurring at a frequency of about once per cylinder firing rather than attempting to measure instantaneous values as shown in FIG. 1. FIG. 2 shows an apparatus for measuring velocity and obtaining corrected acceleration values according to the present invention. An engine rotation position sensing system includes a rotor 20 including vanes 21, 22, and 23 which rotate with a crankshaft 24 (a three-vane rotor from a six-cylinder engine is shown in this example). Vanes 21, 22 and 23 pass between a Hall-effect sensor 25 and a permanent magnet 26 to generate a profile ignition pulse (PIP) signal as crankshaft 24 rotates. Vanes 21, 22 and 23 are arranged to generate a rising edge in the PIP signal at a predetermined position in relation to top dead center of each respective cylinder. The PIP signal actually indicates the approach to top dead center of two engine cylinders, one of which is approaching a power stroke and one of which is approaching an intake stroke since it takes two full crankshaft rotations to complete an engine cycle.

A cylinder identification (CID) sensor 27 is connected to a camshaft 28 for identifying which of the two cylinders is actually on its power stroke. Camshaft 28 rotates once for every two rotations of crankshaft 24. The resulting CID signal is preferably generated having a rising edge corresponding to the power stroke of cylinder No. 1. A timer 30 receives the PIP signal and the CID signal and measures elapsed time between predetermined engine position locations as determined by the PIP and CID signals. The elapsed time $\Delta T_i$ for each velocity measuring interval I is output from timer 30 to a velocity and acceleration calculator 31.

In a preferred embodiment, timer 30 and velocity and acceleration calculator 31 are implemented as part of a micro-controller with an associated memory 32 for storing correction factors, other data, and software instructions.

An alternative embodiment of a position sensing apparatus is shown in FIG. 3. A multi-toothed wheel 35 is mounted on an engine for rotation with the crankshaft. A plurality of teeth 36 are disposed along the periphery of wheel 35 at a predetermined angular spacing. Teeth 36 are preferably comprised of a metal or other magnetically permeable material. A variable reluctance sensor 37 is disposed in a fixed location closely spaced to teeth 36 for sensing the passage of teeth passed sensor 37. A missing tooth location 38 is provided on wheel 35 to establish an absolute location reference, e.g., at 90° before top dead center of cylinder No. 1. A CID signal (not shown) would also be utilized to differentiate between the two halves of the engine cycle. CID sensors other than a camshaft sensor could alternatively be utilized to resolve the ambiguity between the power stroke and the intake stroke, such as sensors responsive to ignition coil current or voltage. Sensor 37 is connected to a timer 40 and interval former 41 to produce rotation intervals $\Delta t_i$.

Multi-toothed wheel 35 shown in FIG. 3 could be mounted either at the front of an engine or at the rear near the flywheel. In fact, the flywheel itself can be used as a multi-toothed wheel since the periphery of a flywheel includes gear teeth for meshing with a starter motor. Sensor 37 can be mounted either at the front or rear of the engine depending upon the location of multi-toothed wheel 35.

Figure 4:
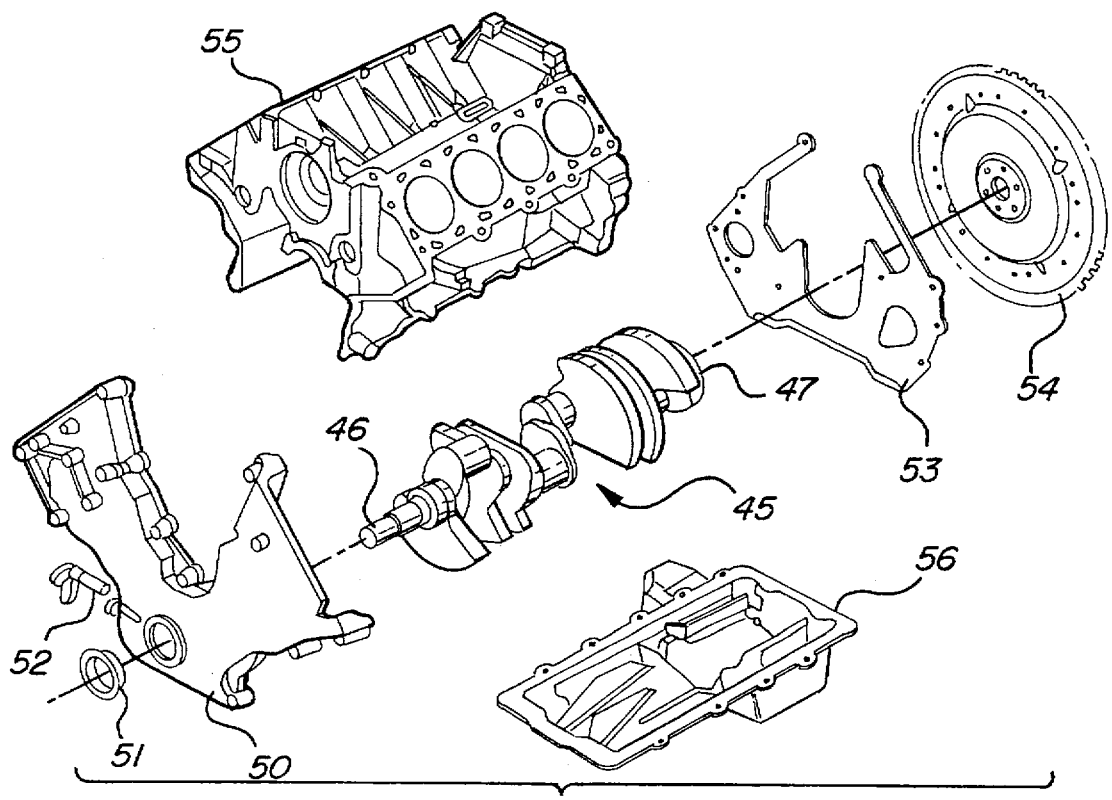
FIG. 4 is an exploded perspective view of portions of an internal combustion engine including a crankshaft.

FIG. 4 shows a crankshaft 45 having a front end 46 and a back end 47. Front end 46 passes through a front engine plate 50 and has a toothed wheel 51 mounted thereto. A variable reluctance sensor 52 is mounted to front plate 50 for detecting rotation of toothed wheel 51. Back end 47 of crankshaft 45 passes through a rear engine plate 53 to a flywheel 54 that is mounted to back end 47. Crankshaft 45 is further enclosed within the internal combustion engine which further includes a cylinder block assembly 55 and an oil pan assembly 56, for example.

Crankshaft 45 exhibits greater inertia at its rear end 47 due to the attachment of the massive flywheel 54. In contrast, the front end 46 of crankshaft 45 exhibits less inertia so that torsional oscillations are magnified at the front crankshaft section relative to the rear section of the crankshaft near the flywheel. Furthermore, the torsional vibrations as measured at the front of the crankshaft are affected more severely by misfires than oscillations at the flywheel.

The present invention provides the misfire identification capability that requires actual measurements to be made anywhere along the crankshaft, even at the front of the crankshaft. Specifically, the invention employs a time-lagged recurrent neural network that utilizes cylinder identification, load, speed and acceleration measurements to identify misfire events. Better misfire detection capability is obtained overall using a crankshaft position sensor mounted at the flywheel, although flywheel acceleration measurements still benefit from using torsional modeling implicitly contained within the neural network.

The preferred embodiment of the present invention uses trainable neural networks to perform the nonlinear, dynamic transformation to identify when a misfire event takes place. Artificial neural networks are trained by representative data sequences that relate outputs of a system to its inputs. In the present invention, a time-lagged recurrent neural network modifies a signal representing crankshaft accelerations to a more accurate signal to be used to identify misfire events. This is not a discrete step, but a modification which occurs constantly throughout the operation of the time-lagged recurrent neural network.

Figure 5:
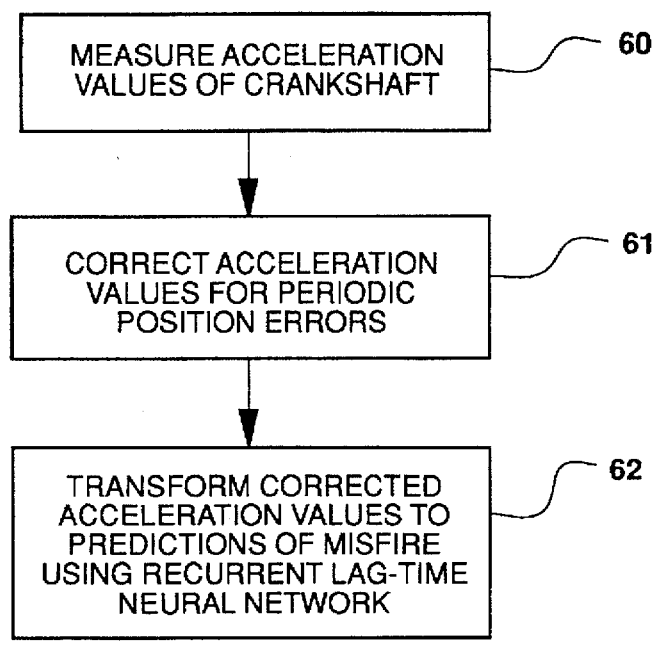
FIG. 5 is a flow chart showing a preferred method for transforming acceleration values.

Misfire detection in an in-use vehicle system proceeds according to the method shown in FIG. 5. In step 60, rotation quantities corresponding to individual cylinder events are measured at the front of the crankshaft (or at any section of the crankshaft remote from a damped section of the crankshaft). A preferred rotation quantity to be determined is acceleration. As used herein, the term "rotation quantity" refers to temporal measurements between predetermined crankshaft positions or any other determined quantity such as velocity or acceleration that can be used in the misfire detector.

In step 61, the measured rotation quantities, the temporal signal generated from the temporal measurements, are corrected for periodic position errors. In step 62, wheel-profile corrected acceleration values are eventually transformed to identify misfire events. The transform is nonlinear and preferably has been determined and recorded at a plurality of various engine operating conditions such as engine speed and load both with and without known misfires introduced. As may be seen in FIG. 9, data for individual cylinders over the entire spectrum of internal combustion engine operating conditions is shown. Finally, the acceleration values, along with cylinder identification, engine speed and load, are used by the time-lagged recurrent neural network to identify cylinder-specific misfire events.

Figure 9:
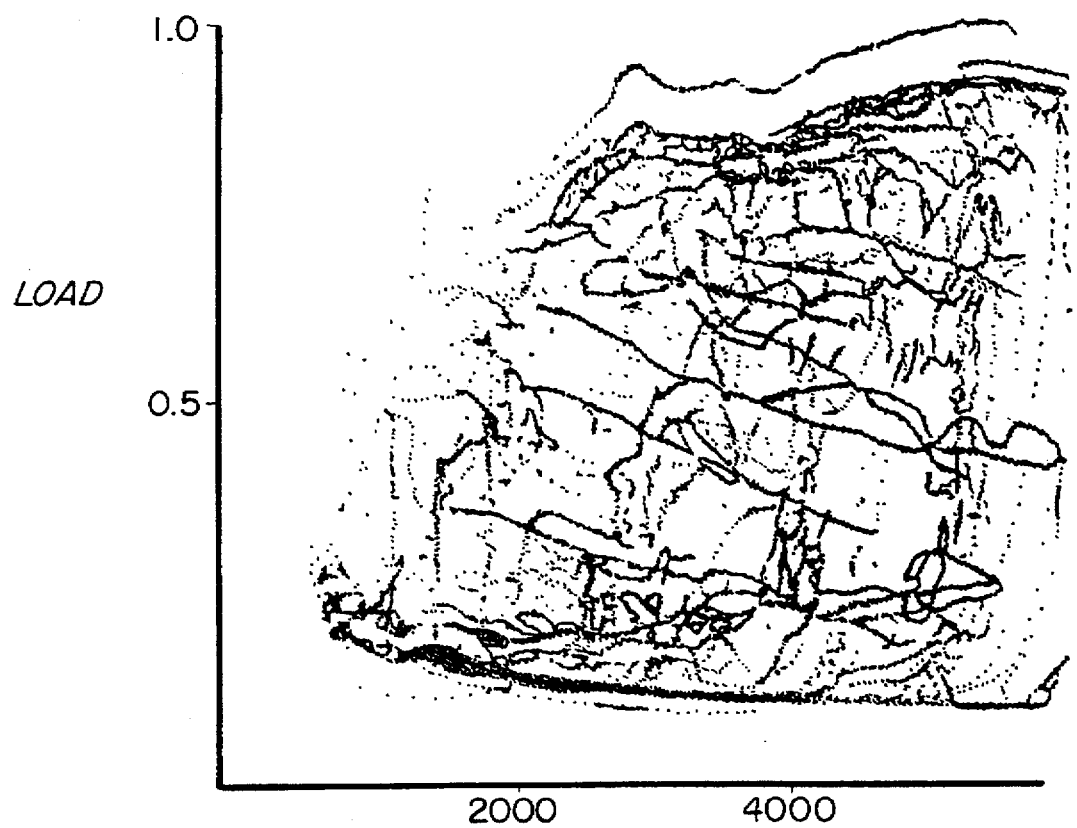
FIG. 9 is a plot of speed-load trajectory data for training neural networks under dynamic conditions.

The output of the time-lagged recurrent neural network is a signal of MISFIRE identification from the previous cycle of the internal combustion engine. The training data, a portion of which are shown in FIG. 9, is gathered over a wide range of operating conditions and a wide range of pseudo-random misfire patterns, including periods of no misfire events. The output of the network is a signal consisting of cylinder-specific MISFIRE identifications for each firing. In a preferred embodiment, the single time-lagged recurrent neural network may be used to accomplish both the transformation and diagnostic classification tasks simultaneously.

A neural network weight update procedure based on a decoupled extended Kalman filter (DEKF) algorithm in one embodiment is far more effective for both feedforward and recurrent networks than training procedures based on simple gradient updates. Beyond merely faster learning, the DEKF algorithm frequently produces solutions that otherwise would not have been found. Although this is the preferred training algorithm, any gradient-based neural network training algorithm may be used.

Even using DEKF, training a recurrent network on a complex dynamical relationship can be difficult because a network tends to learn new input-output relationships while forgetting what it had learned earlier. In static feedforward network training, this tendency is usually countered by scrambling the order of presentation. For recurrent networks, on the other hand, scrambling at the level of instances is not possible because the sequential nature of the data must be preserved.

As a solution to the difficulty of training on sequences of data, a technique called multi-stream DEKF training is used. (Feldkamp and Puskorius, *Training Controllers for Robustness: Multi-Stream DEKF*, Proceedings of the 1994 International Conference on Neural Networks, pp. 2488-2493 (1994)). Using the multi-stream DEKF training, each weight update attempts to satisfy simultaneously the demands from multiple input-output pairs. A randomly chosen set of files are assigned to streams, the starting point of which is randomly chosen. Training occurs for the set of current points as points are selected in a parallel fashion from each stream. Derivatives are computed for each stream separately, generally by truncated back propagation through time. The nature of the Kalman recursion, in this embodiment, is to produce weight updates which are not a simple average of the weight updates that would be computed separately for each output.

Figure 6:
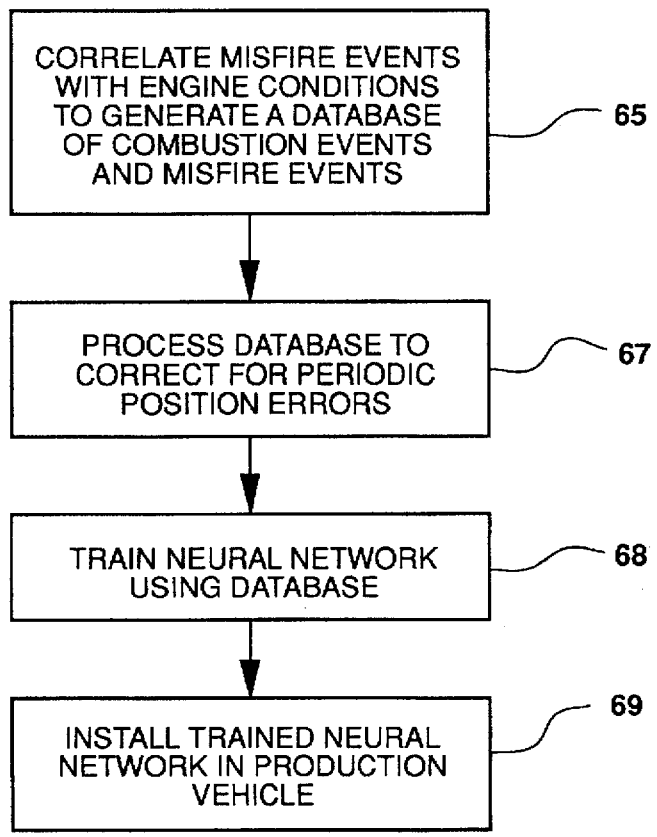
FIG. 6 is a flow chart showing the training process for the present inventive method.

The transform for a particular vehicle is derived using the method shown in FIG. 6. Although any particular transform is valid for a single engine/power train design, it will also be valid for each engine/power train built according to that particular design. To obtain a transform for a particular engine/power train design, misfires are artificially introduced during engine operation over a wide range of conditions in step 65. Also at this time, a record of misfire events is gathered or generated in correlation with other engine parameters. The acceleration data is wheel-profile corrected for periodic position errors in step 67 according to the correction method described in U.S. Pat. No. 5,117,681, which is hereby incorporated by reference.

In step 68, a neural network is trained using the database of acceleration cylinder identification, speed and load data. Position information from the position sensor and data identifying the engine operation, such as cylinder identification, engine speed and load, and crankshaft acceleration are provided to the neural network as inputs while data indicating the presence or absence of a misfire event is presented as the correct output to be associated with those inputs. The trained neural network learns to predict the data from the acceleration and the engine operating conditions. In step 69, the trained neural network is installed in a production vehicle where it will then transform acceleration values, using cylinder identification, engine speed and load, to identifications of misfire events.

Figure 7:
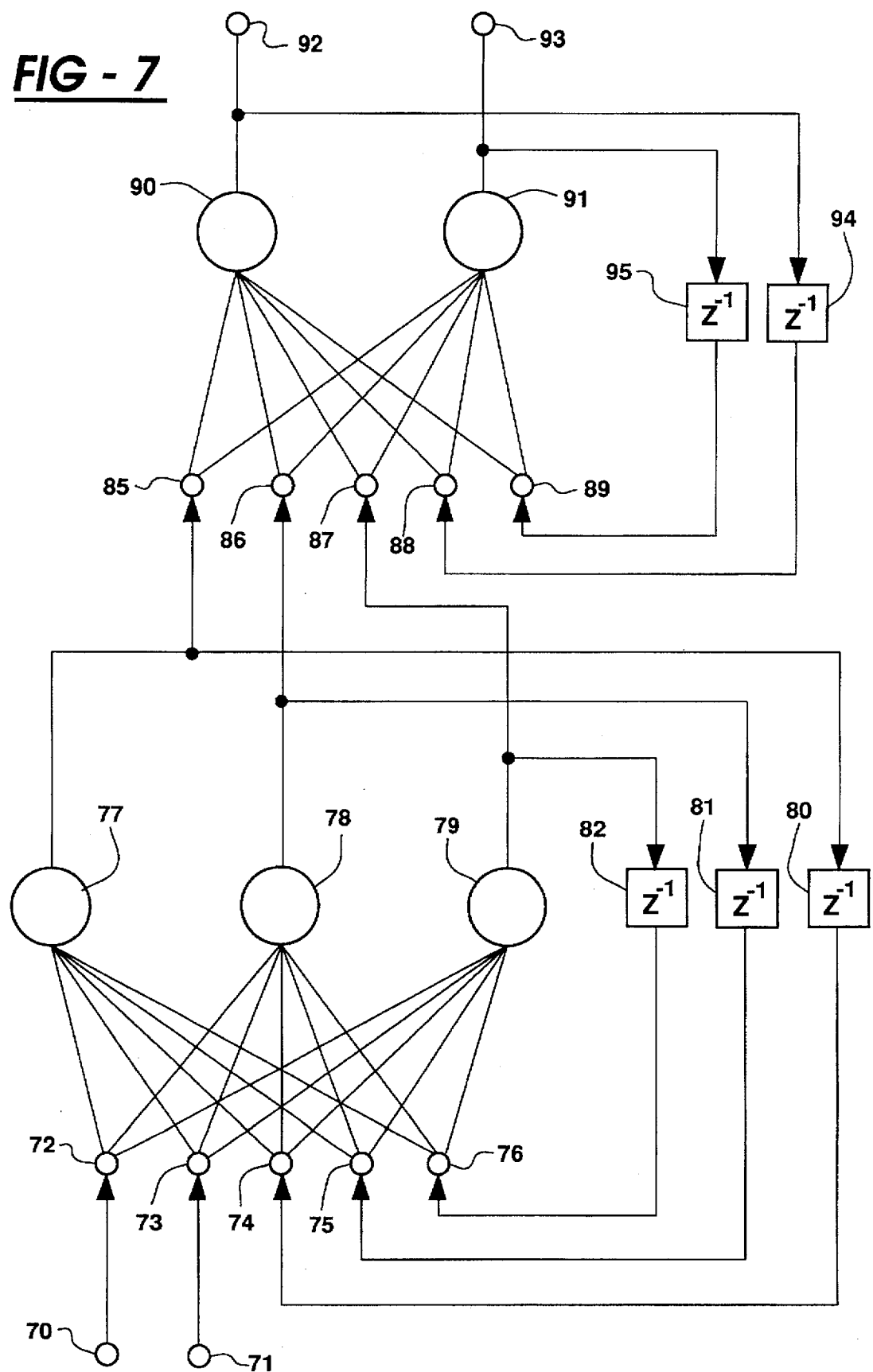
FIG. 7 is a schematic diagram showing a generic architecture for constructing a time-lagged recurrent neural network.

FIG. 7 shows a generic time-lagged recurrent neural network architecture of the type that is useful in the present invention. The architecture includes a pair of inputs 70 and 71 and a pair of outputs 92 and 93. Input signals from inputs 70 and 71 are coupled to distribution points 72 and 73 from where they are distributed to each node or processing element in a first input layer including nodes 77, 78 and 79. The outputs of nodes 77, 78 and 79 are fed back to the inputs of nodes 77, 78 and 79 through unit delay blocks 80, 81 and 82 and distribution points 74, 75 and 76. The outputs of nodes 77, 78 and 79 are further input to an output layer of nodes 90 and 91 through distribution points 85, 86 and 87. The output layer further includes feedback through unit delay blocks 94 and 95 and distribution points 88 and 89. By adjusting values for weights connected to each node or processing element, the neural network learns to associate particular values of inputs with particular values of outputs. By virtue of feedback through the unit delay blocks, this neural network architecture is well suited for representing and processing sequential or dynamical and nonlinear behaviors, such as a crankshaft torsional acceleration transformation function. The architecture of FIG. 7 is easily modified to accommodate other numbers of inputs and outputs, layers, nodes and weights.

In previous work, linear output nodes were employed. These linear output nodes were used to map front acceleration of the crankshaft to rear acceleration of the crankshaft to rid the acceleration signal of torsional oscillations prior to misfire detection by a dedicated system not a part of the neural network. Here, the output nodes are sigmoidal. More specifically, the output nodes use a bipolar sigmoidal activation function to perform the dichotomous classification of combustion events and misfire events. If the value exceeds a generated threshold, zero in one embodiment, it is identified as a misfire event. If not, it is determined to be a normal combustion event.

Figure 8:
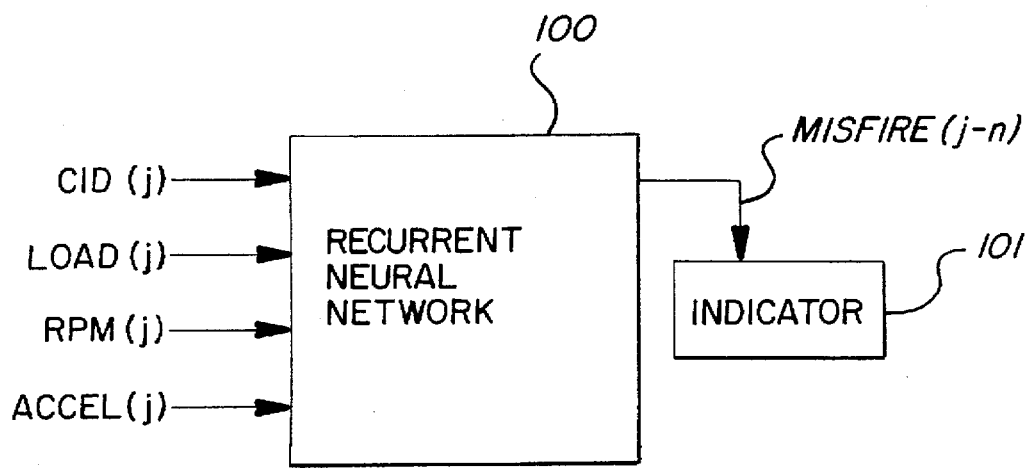
FIG. 8 is a block diagram using inputs and outputs to a neural network that implements the present inventive method.

In a preferred embodiment as shown in FIG. 8, a time-lagged recurrent neural network 100 utilizes four inputs and one output to perform the transformation from engine performance data and misfire event identification. FIG. 8 shows a trained network that is installed in a vehicle and includes the coefficients determined during training. The four inputs to the time-lagged recurrent neural network for each individual cylinder firing $n_i$ (where I is an index variable designating the $i^{th}$ event), include cylinder identification CID $(n_i)$, engine load LOAD $(n_i)$, engine speed RPM $(n_i)$, and crankshaft acceleration ACCEL $(n_i)$. CID $(n_i)$ represents cylinder acceleration measurements corresponding to cylinder No. 1, such that CID $(n_i)$ is set equal to 1 for that one cylinder acceleration measurement during each engine cycle and is zero otherwise. LOAD ($n_i$) represents instantaneous engine load. RPM ($n_i$) represents instantaneous engine speed. ACCEL ($n_i$) represents crankshaft acceleration as wheel-profile corrected. The single output from neural network 100 is denoted by MISFIRE (j-n) for representing the identification of a misfire event. Indicator 101 may be any type of indicator, such as a lamp, to indicate to the operator that a statistical model, graphically incorporated with the indicator 101, has determined that a particular cylinder is misfiring to such an extent that service is required.

In this preferred embodiment, a network architecture was employed having four inputs, a first layer of fifteen recurrent nodes, a second layer of seven recurrent nodes, and one non-linear sigmoidal output, as discussed above.

In training the neural network to operate as shown in FIG. 8, a preferred training algorithm is based on an extension of DEKF algorithm as described in Puskorius and Feldkamp, *Neurocontrol of Nonlinear Dynamical Systems with Kalman Filter Trained Recurrent Networks*, IEEE Trans. on Neural Networks, Vol. 5, No. 2 (March 1994), although in principle any gradient-based neural network training algorithm can be used. This extension is the multi-stream DEKF, discussed above.

After neural network coefficients for each node or processing element are obtained from training, the coefficient values are replicated in each neural network to be installed on a vehicle having the particular engine/powertrain combination. In operation on each vehicle, crankshaft rotation intervals are measured and successive intervals are used to determine acceleration corresponding to each respective cylinder event. The acceleration values are corrected as described in U.S. Pat. No. 5,117,681. Engine speed and load are obtained from the electronic engine control (not shown) that controls the engine. The identity of a particular cylinder firing is also obtained from the electronic engine control. The identity may be determined using a timing signal generated by the electronic engine control. This data is formatted into an input vector to be provided to the neural network. The value of CID ($n_i$) synchronizes the operation of the neural network to specific cylinder events. LOAD ($n_i$) and RPM ($n_i$) identify a global context of the engine operating condition within the dynamic range of engine conditions for which the synchronization of the ACCEL ($n_i$) needs to be made subject to the particular cylinder under consideration. The final component in the input vector to the neural network is the acceleration of the crankshaft ACCEL ($n_i$). The input vector propagates through the time-lagged recurrent neural network to identify a misfire event for the current cylinder from the preceding engine cycle denoted as MISFIRE (j-n), where n is the number of engine cylinders, although n can be chosen to have other values.

Referring to FIGS. 10b and 10c, examples of rotational speed of the crankshaft and measured load are shown, respectively. FIG. 10a is a graphic representation of acceleration, corrected for wheel profile, as measured by the position sensor at the front of the crankshaft. These three inputs, along with the cylinder identification input, CID ($n_i$), are used by the time-lagged recurrent neural network to generate its output, MISFIRE (j-n). The circles in FIG. 10a represent misfire events. The dots are normal combustion events for the internal combustion engine. As may be seen when viewing FIG. 10a, it becomes more difficult to discern between normal combustion events and misfire events in the acceleration data as the engine speed continues to increase.

Referring to FIG. 11, the output of the neural network, MISFIRE (j-n), is shown wherein a value of 1.0 represents a misfire event and a value of −1.0 represents the absence of a misfire event, i.e., a normal combustion event. It may be appreciated by those skilled in the art that misfire identification is accurate over a wide range of operating conditions.

What is claimed is:

1. A method for identifying misfire events in an internal combustion engine having a plurality of cylinders, a crankshaft and a crankshaft position sensor, the method comprising the steps of:
    operating the internal combustion engine to rotate the crankshaft;
    measuring rotational quantities of the crankshaft corresponding to events created by each of the plurality of cylinders during operation of the internal combustion engine;
    correcting the rotational quantities measured to remove periodic position irregularities to generate a corrected temporal signal;
    generating an acceleration signal of the crankshaft using the corrected temporal signal;
    applying a recurrent neural network to the acceleration signal; and
    identifying misfire events as a function of the acceleration signal.

2. A method as set forth in claim 1 wherein the recurrent neural network is a time-lagged recurrent neural network.

3. A method as set forth in claim 2 including the step of training the time-lagged recurrent neural network with training data points of engine combustions.

4. A method as set forth in claim 3 wherein the training data points of engine combustions includes random patterns of misfire events.

5. A method as set forth in claim 4 including the step of using rotating speed of the crankshaft for an input to the time-lagged recurrent neural network.

6. A method as set forth in claim 4 including the step of using engine load for an input to the time-lagged recurrent neural network.

7. A method as set forth in claim 2 wherein the step of identifying misfire events includes the step of comparing the acceleration signal to a threshold signal.

8. A method as set forth in claim 7 including the step of generating the threshold signal based on the acceleration signal.

9. A method as set forth in claim 6 including the step of training the recurrent neural network with training data points of engine combustions.

10. A method as set forth in claim 9 wherein the training date points of engine combustions includes random patterns of misfire events.

11. A method as set forth in claim 10 including the step of using rotating speed of the crankshaft for an input to the recurrent neural network.

12. A method as set forth in claim 10 including the step of using engine load for an input to the recurrent neural network.

13. A method for identifying misfire events of an internal combustion engine having a plurality of cylinders, a crankshaft and a crankshaft position sensor, the method comprising the steps of:
    operating the internal combustion engine to combust an air/fuel mixture in each of the plurality of cylinders;
    receiving a timing signal identifying when each of the plurality of cylinders combusts the air/fuel mixture;
    determining an acceleration signal of the crankshaft using the timing signal;
    applying a recurrent neural network to the acceleration signal; and
    identifying misfire events as a function of the acceleration signal.

* * * * *